United States Patent [19]

Preller

[11] Patent Number: 5,420,776

[45] Date of Patent: May 30, 1995

[54] BLOCKING-OSCILLATOR SWITCHED-MODE POWER SUPPLY WITH SINUSOIDAL CURRENT CONSUMPTION

[75] Inventor: Peter Preller, München, Germany

[73] Assignee: Siemens Aktiengesellschaft, Munich, Germany

[21] Appl. No.: 153,875

[22] Filed: Nov. 17, 1993

[30] Foreign Application Priority Data

Nov. 17, 1992 [DE] Germany .......... 42 38 808.2

[51] Int. Cl.⁶ .......................................... H02M 3/335
[52] U.S. Cl. .................................. 363/18; 363/19
[58] Field of Search ................... 363/16, 18, 19, 20, 363/21, 49, 97, 131, 132; 323/282; 331/30, 31, 109, 111, 112

[56] References Cited

U.S. PATENT DOCUMENTS

| 4,564,820 | 1/1986 | Peruth et al. | 331/62 |
| 4,617,533 | 10/1986 | Paulik | 331/113 A |
| 4,984,145 | 1/1991 | Dangschat et al. | 363/19 |
| 5,317,494 | 5/1994 | Noro | 363/18 |

FOREIGN PATENT DOCUMENTS

| 464240 | 1/1992 | European Pat. Off. | H02M 3/335 |
| 4008652 | 9/1991 | Germany | H02M 3/28 |

OTHER PUBLICATIONS

Siemens brochure, "Funktion und Anwendung des Sperrwandler-IC TDA 6405", Catalog No. B111-B6090.

Primary Examiner—Thomas M. Dougherty
Assistant Examiner—Matthew V. Nguyen
Attorney, Agent, or Firm—Herbert L. Lerner; Laurence A. Greenberg

[57] ABSTRACT

A blocking-oscillator switched-mode power supply for sinusoidal current consumption includes a transformer having a primary winding. A smoothing capacitor is connected to the primary winding. A bridge rectifier is connected to the smoothing capacitor. A semiconductor switching element is connected to the primary winding for the clocked application of an alternating voltage, being rectified by the bridge rectifier and smoothed by the smoothing capacitor, to the primary winding. A control device is connected to the semiconductor switching element for triggering the semiconductor switching element. A current pump is connected to the smoothing capacitor and to the bridge rectifier for receiving current from the bridge rectifier during a turn-on phase of the semiconductor switching element and outputting a charged current to the smoothing capacitor during a blocking phase of the semiconductor switching element.

9 Claims, 5 Drawing Sheets

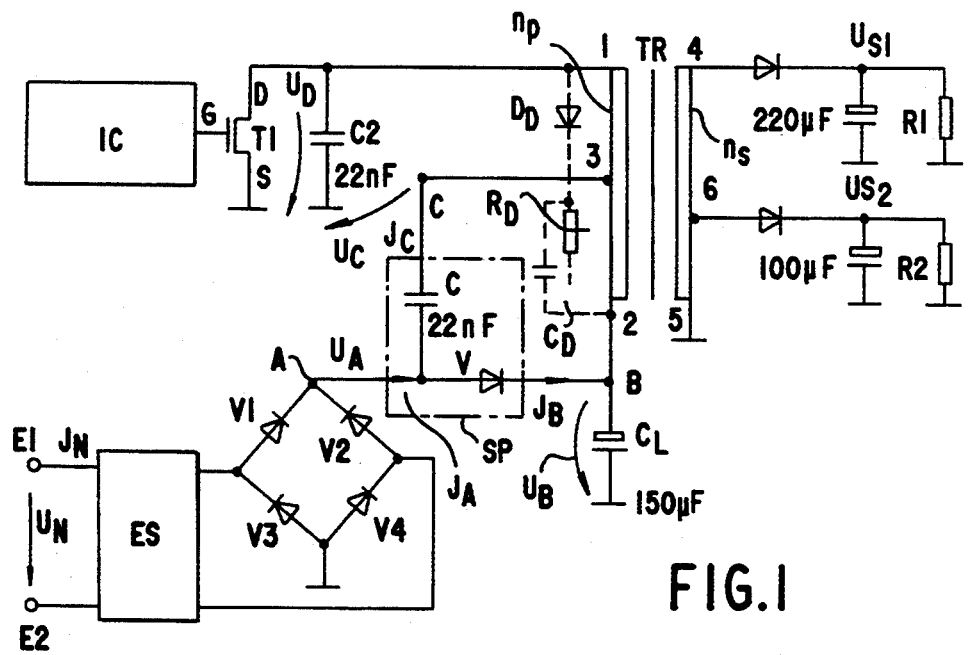
FIG.1
FIG.2(A)
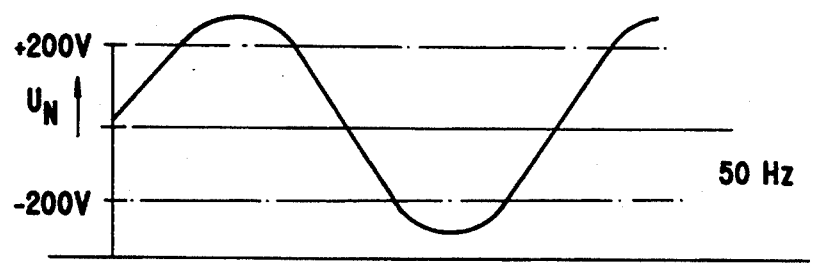
FIG.2(B)
FIG.2(C)

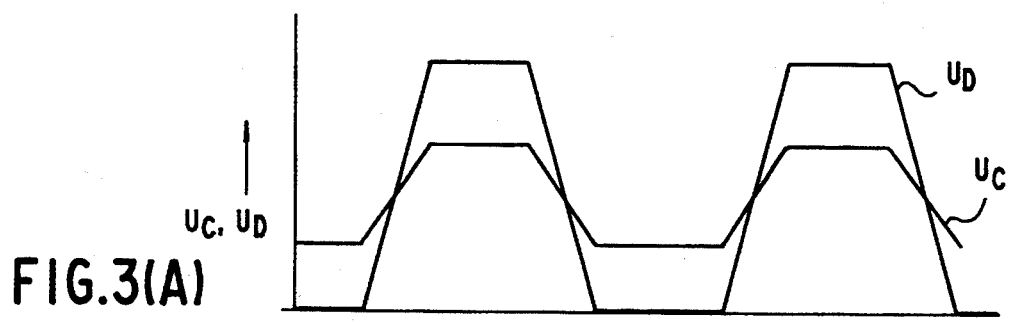
FIG.3(A)
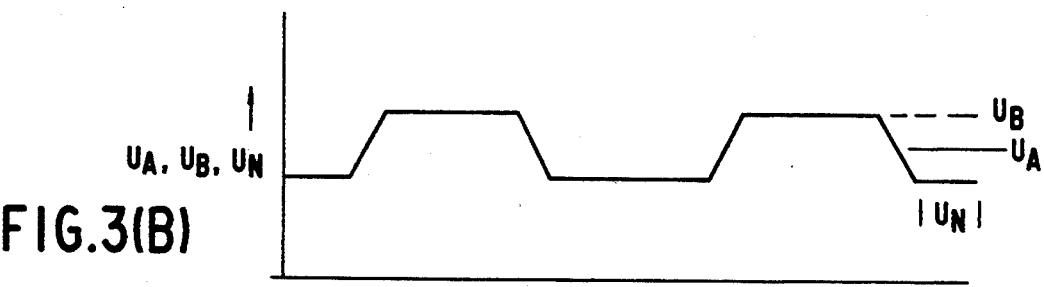
FIG.3(B)
FIG.3(C)
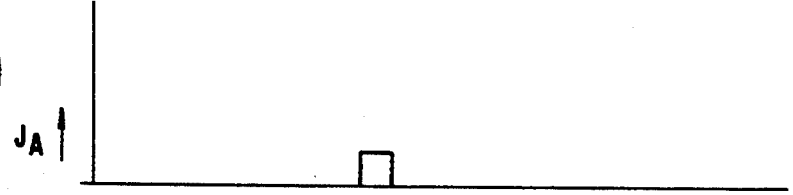
FIG.3(D)
FIG.3(E)
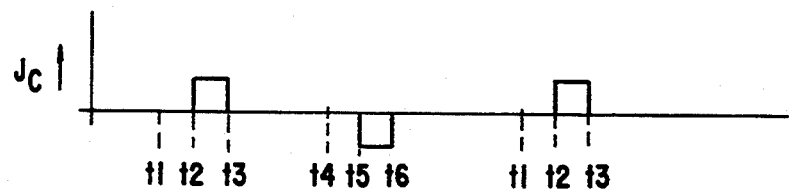

BLOCKING-OSCILLATOR SWITCHED-MODE POWER SUPPLY WITH SINUSOIDAL CURRENT CONSUMPTION

BACKGROUND OF THE INVENTION

FIELD OF THE INVENTION

The invention relates to a blocking-oscillator switched-mode power supply for sinusoidal current consumption, having a semiconductor switching element for the clocked application of an alternating voltage, rectified by a bridge rectifier and smoothed by a smoothing capacitor, to a primary winding of a transformer, and having a control device for triggering the semiconductor switching element.

Switched-mode power supplies are high-frequency sources of interference that require spark-type interference suppression. If switched-mode power supplies are supplied with mains-type alternating voltage that needs to be rectified, then undesirable harmonic currents appear in the power supply system or power grid, and in the future such harmonic currents will no longer be accepted by power supply enterprises, because limit values of allowable harmonic currents are being made more stringent. A sinusoidal current consumption by the switched-mode power supplies is therefore sought.

While heretofore in switched-mode power supplies, spark interference suppression functioned essentially well as a result of current-compensated chokes, nevertheless the harmonic currents caused by the switched-mode power supplies remained unnoticed in the grid. Since the more stringent limit values for allowable harmonic currents also apply to switched-mode power supplies in communications equipment, such as TV sets, it is necessary to reduce the harmonic currents. That can be achieved only by means of a sinusoidal current consumption by the switched-mode power supply.

Blocking-oscillator switched-mode power supplies with sinusoidal current consumption have already been described. Published European Application No. 0 464 240 A1, corresponding to U.S. application Ser. No. 08/108,771, filed Aug. 18, 1993, for instance, for the sinusoidal current consumption by the switched-mode power supply, has proposed the clocked application to the primary winding of a transformer of an alternating voltage, rectified by a bridge rectifier, but unsmoothed, through a semiconductor switching element. The semiconductor switching element is triggered by a control device in accordance with at least one primary current signal to be applied to a first input terminal of the control device. That primary current signal is furnished through a one-way rectifier configuration, connected to the bridge rectifier and followed by an RC element.

A switched-mode power supply shown in German Published, Non-Prosecuted Application DE 40 08 652 A1 has a charging capacitor, which assures in cooperation with an inductive resistor and a diode network that brief drops in or outages of the mains alternating voltage will be compensated for. To that end, the capacitor is charged when the switching element is turned off and discharged when the switching element is conducting.

SUMMARY OF THE INVENTION

It is accordingly an object of the invention to provide a blocking-oscillator switched-mode power supply with sinusoidal current consumption, which overcomes the hereinafore-mentioned disadvantages of the heretofore-known devices of this general type and which provides another possibility of attaining a sinusoidal current consumption by simple means in blocking-oscillator switched-mode power supplies.

With the foregoing and other objects in view there is provided, in accordance with the invention, a blocking-oscillator switched-mode power supply for sinusoidal current consumption, comprising a transformer having a primary winding; a smoothing capacitor connected to the primary winding; a bridge rectifier connected to the smoothing capacitor; a semiconductor switching element connected to the primary winding for the clocked application of an alternating voltage, being rectified by the bridge rectifier and smoothed by the smoothing capacitor, to the primary winding; a control device connected to the semiconductor switching element for triggering the semiconductor switching element; and a current pump connected to the smoothing capacitor and to the bridge rectifier for receiving current from the bridge rectifier during a turn-on phase of the semiconductor switching element and outputting a charged current to the smoothing capacitor during a blocking phase of the semiconductor switching element.

In accordance with another feature of the invention, the current pump of the invention has a capacitive device and a rectifier configuration, and the rectifier configuration is connected between an output of the input-side bridge rectifier of the switched-mode power supply and a terminal of the smoothing capacitor in such a way that the smoothing capacitor is charged. The capacitive device is connected between the bridge rectifier and a tap of the primary winding of the transformer, wherein the tap is advantageously the middle tap in a first embodiment.

In accordance with a further feature of the invention, in a second embodiment, a choke is inserted between the output of the bridge rectifier and the terminals of the capacitive device and the rectifier configuration being oriented toward it. The capacitive device is connected between the bridge rectifier and one tap of the primary winding of the transformer. The tap is preferably located outside the connections for the rectified, smooth alternating voltage of the primary winding. In that case current consumption from the grid takes place during the entire turn-on phase and as a function of the instantaneous phase of the grid voltage, partly during the off phase of the semiconductor switching element.

If only a capacitor is used as the capacitor device and only a diode is used as the rectifier configuration, for instance, it has been found that this circuit configuration can also be effectively used to damp overshoot pulses upon turn-on and turn-off of the semiconductor switching element. Therefore, with the current pump of the invention, the damping circuit, which is also known as a snubber circuit, that is otherwise conventional with switched-mode power supplies, can then be dispensed with. In the known blocking-oscillator switched-mode power supplies, the damping circuit typically included a diode, a capacitor and a resistor, as can, for instance, be learned from the Siemens product information brochure entitled "Funktion und Anwendung des Sperrwandler-IC TDA 4605" [Function and Use of the TDA 4605 Blocking Oscillator IC], catalog number B111-B6090, FIG. 25 (see elements R6, C5 and V5 therein). Through the use of the circuit configuration of the invention, having only one capacitor and one diode, the expenditure for componentry required for this purpose can be reduced by one resistor.

The action of the current pump according to the invention can be adjusted arbitrarily between full action and no action by means of the dimensioning of the capacitor device and the selection of the tap at the primary winding. By selecting the location of the tap, the voltage rise at the terminal of the capacitor device connected to the rectifier configuration is defined. It may be less than the voltage rise at the semiconductor switching element, if the capacitor device is located at a tap between the connections of the primary winding for the clocked and rectified alternating voltage. The voltage rise at the aforementioned terminal of the capacitive device is on the order of magnitude of the voltage rise at the semiconductor switching element, if the tap coincides with the connection of the primary winding intended for the semiconductor switching element. Taking parasitic effects of the components into account, it is advantageous, in order to attain an approximately equal-magnitude voltage rise, to place the tap for connecting the capacitor device to the primary winding outside the power supply connections of the primary winding.

In the first embodiment, the winding ratio of the primary winding to the second winding of the transformer is preferably selected in such a way that the charging voltage $U_D$ dropping at the semiconductor switching element, which is typically the drain voltage in MOS transistors, always reaches the 0-V line before the semiconductor switching element is turned on again. Otherwise, residual charges that are present in the capacitor device according to the invention and in a capacitor connected parallel to the load path of the semiconductor switching element would flow through the semiconductor switching element and heat it unnecessarily.

The blocking-oscillator switched-mode power supply according to the invention has the following advantages:
 a low ripple voltage in the secondary-side output voltage;
 less interference radiation in the high-frequency range because of gentler switching edges and reduced overshoot pulses;
 omission of a damper circuit for overshoot pulses, since overshoot pulses are damped by the current pump and their energy is recovered; and
 less expenditure for circuitry.

Other features which are considered as characteristic for the invention are set forth in the appended claims.

Although the invention is illustrated and described herein as embodied in a blocking-oscillator switched-mode power supply with sinusoidal current consumption, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a basic schematic circuit diagram of a first embodiment of a blocking-oscillator switched-mode power supply with sinusoidal current consumption according to the invention;

FIG. 2 is a diagram of the courses of current and voltage in the blocking-oscillator switched-mode power supply of FIG. 1;

FIG. 3 is a diagram of the courses of current and voltage, which are expanded in terms of time as compared with FIG. 2;

DESCRIPTION OF THE PREFERRED EMBODIMENTS

Figure 4:
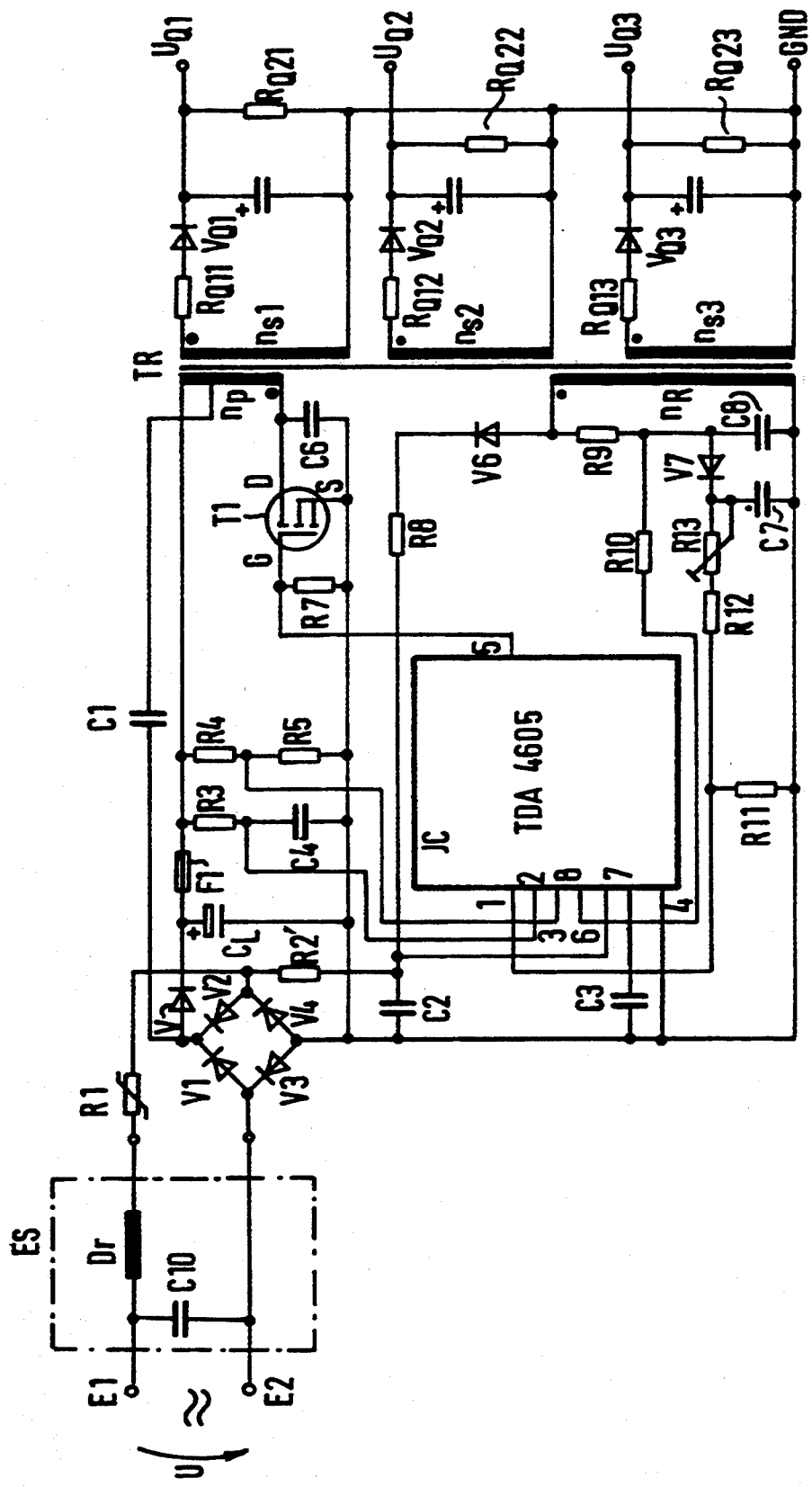
FIG. 4 is a more-detail circuit diagram of a blocking-oscillator switched-mode power supply having a current pump in accordance with a first embodiment of the invention.

Referring now to the figures of the drawing in detail and first, particularly, to FIG. 1 thereof, there is seen a basic circuit diagram of a blocking-oscillator switched-mode power supply with sinusoidal current consumption in accordance with a first embodiment of the invention. The blocking-oscillator switched-mode power supply includes a transformer TR with a primary winding $n_P$ having terminals 1, 2 and 3. The primary winding $n_P$ is located between the terminals 1 and 2, while the terminal 3, which is described in more detail below, for example, is a middle tap of the primary winding $n_P$. On the secondary side, the transformer TR has a secondary winding $n_S$ with terminals 4, 5 and 6. The terminal 5 is at reference potential, while each of the terminals 3 and 6 are connected to a respective one-way rectifier having a respective output at which there is a respective load R1 and R2. The structure of the secondary side of the transformer TR may be chosen arbitrarily, depending on how many output voltages of the blocking-oscillator switched-mode power supply are to be available and how high corresponding secondary-side output voltages $U_{S1}$, $U_{S2}$ should be. Instead of a single secondary-side winding $n_S$, a plurality of secondary windings may also be provided on the secondary side.

The blocking-oscillator switched-mode power supply also has a semiconductor switching element T1, which is preferably an MOS transistor, for the clocked application of an alternating voltage $U_N$, rectified by a bridge rectifier V1, V2, V3, V4 and smoothed by a smoothing capacitor $C_L$, to the primary winding $n_P$ of the transformer TR. To that end, the bridge rectifier V1, V2, V3, V4 has input terminals which are connected, preferably through an interference suppression filter ES, to terminals E1, E2 of a grid alternating voltage $U_N$. The grid alternating voltage $U_N$ may be 220 V, for instance.

A rectified output voltage $U_A$ can be tapped at the output of the bridge rectifier V1, V2, V3, V4, specifically between the connecting point of the diodes V1 and V2 and the connecting point of the diodes V3 and V4, which is connected to reference potential. According to the invention, a connecting point A of the diodes V1 and V2, that is of their cathode connections, is connected through a rectifier configuration to one terminal B of the smoothing capacitor $C_L$. The smoothing capacitor $C_L$ has another terminal which is at reference potential. The rectifier configuration is preferably a diode V, having an anode connection which is connected to the cathode connections of the diodes V1, V2 of the bridge rectifier V1, V2, V3, V4 and having a cathode connection which is connected to the smoothing capacitor $C_L$. The connecting point of the diode V and the smoothing capacitor $C_L$ is connected to the terminal 2 of the primary winding $n_P$. The terminal 1 of the primary winding $n_P$ is connected to reference potential through the load path of the semiconductor switching element T1. In the event that an MOS transistor is used as the semiconductor switching element T1, for that purpose the terminal 1 of the primary winding $n_P$ is connected to a drain connection D of the MOS transistor, and a source connection S of the MOS transistor is connected to reference potential. A capacitor C2 is also connected parallel to the load path of the semiconductor switching element T1. The semiconductor switching element T1 is triggered through its control connection, which in the case of an MOS transistor is its gate connection G, by a control device IC.

According to the invention, the circuit configuration of FIG. 1 also has a capacitive device, preferably a capacitor C, which is connected between the terminal 3 of the primary winding $n_P$ of the transformer TR and the cathode connections of the diodes V1, V2 of the bridge rectifier V1, V2, V3, V4. The configuration of the capacitive device C in the rectifier configuration V acts as a current pump SP, which always consumes current from the bridge rectifier V1, V2, V3, V4 when the semiconductor switching element T1 is turned on and outputs a charged current to the smoothing capacitor $C_L$ again when the semiconductor switch T1 blocks. The mode of operation of the switched-mode power supply of FIG. 1 will be described in detail below in conjunction with FIGS. 2 and 3.

The circuit configuration of FIG. 1 also has a damping circuit $D_D$, $R_D$ and $C_D$, in the form of a diode in a series circuit with a parallel circuit of a resistor and a capacitor. The damping circuit is connected between the terminals 1 and 2 of the primary winding $n_P$ of the transformer TR. The damping circuit is only shown in dashed lines, because in the scope of the present invention a damping circuit of this kind can be dispensed with. Through the use of the current pump SP in the form of the capacitive device C and the rectifier configuration V, it is in fact possible for the overshoot pulses of the switched-mode power supply to be effectively damped.

The courses of the voltages and currents of FIG. 1 are explained below with reference to FIGS. 2 and 3 and are significant for comprehension of the invention. Reference symbol $U_N$ represents the grid alternating voltage at the terminals E1, E2, and reference symbol $I_N$ indicates a current drawn at these terminals E1, E2. Reference symbol $U_A$ indicates the voltage at the output terminals of the bridge rectifier V1, V2, V3, V4. Reference symbol $I_A$ indicates a current that flows between the output of the bridge rectifier V1, V2, V3, V4 and the current pump SP. Reference symbol $I_C$ is the current through the capacitive device C of the current pump SP, and reference symbol $I_B$ is the current from the current pump SP to the smoothing capacitor $C_L$. Reference symbol $U_C$ indicates a voltage at a terminal C from the tap 3 of the primary winding $n_P$, and reference symbol $U_D$ is the voltage along the load path of the semiconductor switching element T1.

In the steady state, the switching frequency of the switched-mode power supply is 40 kHz, for instance. The voltage $U_C$ that can be tapped at the middle tap 3 of the primary winding $n_P$ then has a course like that shown in FIG. 2. The voltage $U_C$ swings back and forth between 200 and 450 V in a 40 kHz cadence, for instance. If the tap 3 is chosen to be closer to the terminal 2 of the primary winding $n_P$ then the voltage rise of the voltage $U_C$ is less, while the voltage rise is greater if the tap 3 is located closer to the terminal 1 of the primary winding $n_P$. If the tap 3 is chosen to be directly at the terminal 1 of the primary winding $n_P$, then the voltage $U_C$ is equal to the charging voltage $U_D$ of the semiconductor switching element T1. In that case the voltage rise would be maximal.

FIG. 2 also shows the course of the grid alternating voltage $U_N$ at the terminals E1, E2 of the blocking-oscillator switched-mode power supply. At a grid alternating voltage of 220 V and a grid alternating frequency of 50 Hz, the voltage at the input terminals E1, E2 changes constantly back and forth between +310 V and −310 V, at a frequency of 50 Hz (220 V×2).

Moreover, FIG. 2 also shows the current course $I_N$ that is drawn from the alternating voltage source by the blocking-oscillator switched-mode power supply of the invention. This current is represented by a solid line in FIG. 2. In actuality, this current $I_N$ is interrupted at the 40 kHz cadence, although the envelope curve of this current takes the course indicated by the solid line. Conversely, the dashed-line curve $I_{NB}$ shows the envelope curve of the current that was usual in blocking-oscillator switched-mode power supplies of the prior art.

During most of one alternating voltage period, the amount of the instantaneous value of the grid voltage $U_N$ is less than the voltage $U_B$ at the smoothing capacitor $C_L$. However, in the known blocking-oscillator switched-mode power supplies without a current pump, current was drawn from the alternating current source only whenever the amount of the instantaneous value of the grid voltage $U_N$ was greater than the voltage $U_B$ at the smoothing capacitor $C_L$. This meant that only a brief current load on the alternating voltage source occurred, and it was impossible to say that there was a sinusoidal current consumption, as the dashed-line curve $I_{NB}$ clearly shows.

The sinusoidal current consumption as shown in FIG. 2 can be explained in a blocking-oscillator switched-mode power supply according to the invention as is shown in FIG. 1, but from the courses shown over time in FIG. 3 of the voltages $U_C$, $U_D$, the voltages $U_A$, $U_B$, and $U_N$, and the currents $I_A$, $I_B$ and $I_C$. Between times t1 and t3, the voltage $U_C$ rises, after the blocking of the semiconductor switching element T1 at the time t1. The voltage $U_A$ is likewise raised through the capacitive device C, until at the time t2 the rectifier configuration V becomes conducting. The voltage $U_A$ remains at the level of the voltage $U_B$. Between the times t2 and t3, the smoothing capacitor $C_L$ is charged through the capacitive device C and the rectifier configuration V with a current $I_C=I_B$. After discharging of the energy of the transformer TR between times t3 and t4 to the secondary side, the voltage $U_C$ drops again between times t4 and t6 by the reverse oscillation, as does the voltage $U_A$ through the capacitive device C. At the time t5, the voltage $U_A$ has reached the instantaneous value of $|U_N|$, remains at that level, and the bridge rectifier V1, V2, V3 and V4 becomes conducting. This means that the current $I_A$ becomes equal to $-I_C$. Between the times t5 and t6, energy from the current grid is temporarily stored in the capacitive device C.

At the time t6, the voltage $U_D$ of the semiconductor switching element T1 reaches the value 0, and the semiconductor switching element T1 becomes reverse-conducting through the inverting diode that is present anyway in the semiconductor switching element. During the reverse conducting phase, the semiconductor switching element T1 is turned on by the trigger device IC (such as a Siemens TDA 4605 integrated circuit configuration). At the time t1, the transformer TR is remagnetized, and a new switching period begins, so that the semiconductor switching element T1 can be blocked again by the trigger circuit IS.

From FIG. 3 it can be seen clearly that the capacitive device C serves as a temporary storage for the current $I_C$, which is stored between the times T5 and T6 and is output to the smoothing capacitor $C_L$ between the times T2 and T3. As was mentioned at the outset, during most of a grid voltage period, the amount of the instantaneous value of the grid voltage $U_N$ is less than the voltage $U_B$ at the smoothing capacitor $C_L$. As a result of the circuit configuration of the invention, a flow of current becomes possible during these times as well, and finally this flow of current enables the sinusoidal current consumption of the switched-mode power supply.

The action of the current pump SP can be adjusted arbitrarily between full action and no action (C=0) by the dimensioning of the capacitive device C. The capacitive device C and the capacitor C2 that is connected parallel to the semiconductor switching element T1 are advantageously of the same size, specifically in the nF range. These capacitors also affect the oscillation frequency of the switched-mode power supply. The result is a transition to the resonant converter as the capacitances of the capacitive device C and capacitor C2 become higher.

In a practical version shown in FIG. 4, the interference suppression network ES is provided in the form of a capacitor C10 that is connected between the terminals E1, E2 and has a choke Dr in a longitudinal branch. Due to the steadiness of the current flowing through the choke Dr, it brings about a further improvement with a view to the most sinusoidal possible current consumption.

The switched mode power supply of FIG. 4 includes an integrated control circuit TDA 4605 for controlling the turn-on and turn-off durations of the switching transistor T1. The control circuit has an input 2, which is supplied by an RC element R3, C4, that is connected parallel to the smoothing capacitor $C_L$. The signal furnished by the RC element R3, C4 is a measure of the primary current flowing through the primary winding $n_P$. A center tap of a voltage divider R4, R5, which is parallel to the smooth capacitor $C_L$, is connected to a terminal 3 of the integrated control circuit TDA 4605. A signal present at the terminal 3 enables the control circuit, when the output voltage of the bridge rectifier V1 . . . V4 exceeds a defined threshold beyond which proper operation of the switched mode power supply is assured. A signal derived from the secondary voltage is fed into an input 1 of the control circuit. This signal is obtained from a secondary winding $n_R$, through an RC element R9, C8, a diode V7, a capacitor C7, and an adjustable voltage divider R13, R12, R11. At an output terminal 5, the control circuit TDA 4605 generates a control signal with which the switching transistor T1 is turned on and off. A resistor R7 is connected between the source and gate terminals of the switching transistor T1 and a capacitor C6 is connected between the source and drain terminals thereof. Controlling the turn-on and turn-off durations is carried out as a function of loads connected to secondary terminals $U_{Q1}$, $U_{Q2}$, $U_{Q3}$. The control information used for this purpose is the primary current signal fed to the terminal. 2 of the integrated control circuit and the secondary voltage signal fed to the terminal 1. The transformer TR also has first, second and third secondary windings $n_{S1}$, $n_{S2}$ and $n_{S3}$. The secondary winding $n_{S1}$ is connected to rectifier components having a resistor $R_{Q11}$ in series with a rectifier diode $V_{Q1}$ that is connected to a secondary terminal $U_{Q1}$, and having a load resistor $R_{Q21}$ connected in parallel with a smoothing capacitor that is connected to ground GND. The second and third secondary windings $n_{S2}$ and $n_{S3}$ have corresponding components, each however being designated with respective suffixes 2 and 3.

For sinusoidal current consumption, the current pump C1, V is used. The capacitor C1 is connected between one output of the bridge rectifier V1 . . . V4 and a pickup terminal of the primary winding $n_P$. This pickup terminal is located between the outer terminals of the primary winding $n_P$. The diode V is connected between the output of the bridge rectifier V1 . . . v4 and the smoothing capacitor $C_L$, which are both connected to a fuse F1. A further current feed is supplied through a start-up resistor R2' connected at one end to the junction between diodes V2, V4 and at the other end to the current feed terminal 6 of the IC.

The integrated control circuit TDA 4605 has the following further terminals: A terminal 4 is connected to primary ground GND. A terminal 6 serves to supply voltage in the steady state. The supply voltage is obtained from the secondary winding $n_R$ by means of rectification through a diode V6 and a smoothing RC element R8, C2. A terminal 7 is provided for the sake of a gentle startup of control. To that end, the terminal is connected to ground through a capacitor C3. At a terminal 8, the voltage at the secondary winding $n_R$ is input through the RC element R9, C8 and a longitudinal resistor R10. From this, the zero crossover of the trailing edge of the secondary voltage is ascertained in the integrated control circuit. The switching transistor T1 is not turned on until after the zero crossover of the secondary voltage has occurred.

Figure 5:
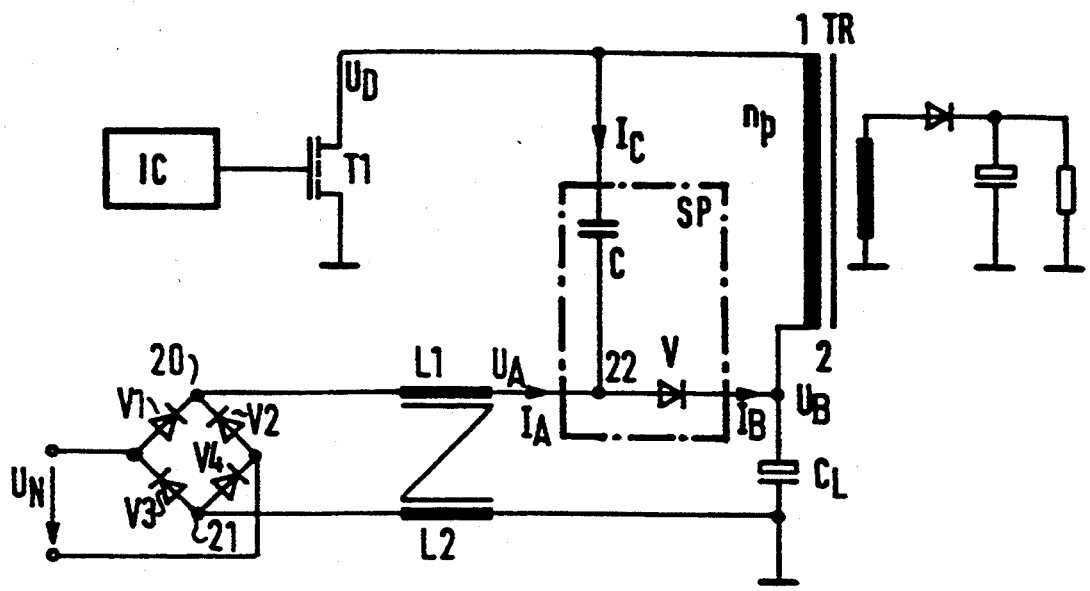
FIG. 5 is a basic circuit diagram of a second embodiment of a blocking-oscillator switched-mode power supply with sinusoidal current consumption according to the invention.

FIG. 5 shows a second embodiment of a blocking-oscillator switched-mode power supply according to the invention. The current pump SP is connected to the connection 1 of the primary winding $n_P$, to which the drain connection of the switching transistor T1 is also connected. A choke L1 is connected between an output connection 20 of the bridge rectifier for tapping the positive voltage and a connection 22 of the current pump SP. Correspondingly, a choke L2 is connected between a connection 21 of the bridge rectifier and the connection of the smoothing capacitor $C_L$ which is connected to ground. The two chokes L1, 12 are coupled in opposite directions. In other words, the magnetic fields induced in the two chokes are superimposed on one another in the same direction whenever the oppositely oriented current of the same magnitude flows through them. The circuit of FIG. 5, like the switched-mode power supply of FIG. 1, does not need any snubber circuit and therefore also does not need the components $D_D$, $R_D$, $C_D$. Moreover no capacitor C2 connected parallel to the load path of the switching transistor T1 is needed either.

The function of the circuit of FIG. 5 will be described below in conjunction with the current and voltage courses shown in FIG. 6 for an instantaneous value of the grid voltage $U_N$. The voltages $U_D$, $U_A$, and the currents $I_{A,B,C}$ that are also shown in FIG. 1, are each tapped at the corresponding point. At a time t11, the switching transistor is blocked by the control device IC. The times when the transistor T1 are turned on and off are defined by the control device IC in accordance with the primary current and the secondary voltage. Immediately after the blocking of the switching transistor T1, its drain voltage $U_D$ rises steeply. This voltage discontinuity is also transmitted along the capacitor C of the current pump SP to the connection or node 22. Once the voltage $U_A$ at the node 22 reaches the value of the voltage $U_B$ that drops along the smoothing capacitor C, the voltage $U_A$ is clamped to $U_B$. The capacitor C is then parallel to the primary winding $n_P$. It is discharged through the current $I_C$, which forms part of the charging current $I_B$ for the smoothing capacitor $C_L$. During the discharge time of the capacitor C, the rise in the voltage $U_D$ proceeds more slowly. Due to the steadiness the current $I_A$ resulting from the choke L1, current continues to be drawn from the bridge rectifier V1 . . . V4. This current furnishes the other contribution to the charging current $I_B$ of the smoothing capacitor $C_L$. Since the voltage of the node 22 is rising, the current $I_A$ decreases with time. The energy stored in the capacitor C and in the choke L1 is accordingly transmitted to the smoothing capacitor $C_L$ during the turn-off phase of the transistor T1. Beginning with a time t12, at which the charge stored in the capacitor C was output, the voltage $U_D$ remains constant. The current $I_B$ is then equal to the current $I_A$.

At a time t13, the switching transistor T1 is made conducting through the control device IC. The drain connection of the transistor T1 is connected to ground, so that the voltage $U_D$ is then 0 V. The voltage discontinuity of equal magnitude is transmitted through the capacitor C to the node 22, so that the voltage of the node can also be negative with respect to ground. The diode V of the current pump SP is then blocked and the current $I_B$ is accordingly zero. Due to the steadiness of the current as a result of the choke L1, the current $I_A$ continues to flow and charges the capacitor C. As a result of the negative potential of the node 22 relative to the output 20 of the bridge rectifier, the current $I_A$ rises with time. The voltage $U_A$ also rises in accordance with the charging characteristic curve of the capacitor C. Upon turn-off of the transistor T1 at a time t14, the cycle described above begins over again.

The choke L1 assures that a steady current $I_A$ will be drawn from the bridge rectifier V1 . . . V4. Depending on the regulation by the control device IC, the turn-on duration of the transistor T1 increases as the effective value of the grid voltage $U_N$ decreases or the secondary load increases. The current through the choke increases as the turn-on duration increases during the turn-on phase. The current consumption of the current pump also rises in this case. With a decreasing effective value of the grid voltage and an increasing secondary load, the action of the current pump is accordingly also increased. The current consumption from the grid is accordingly made to more closely approach the sinusoidal form, and the feedback of current harmonics to the power grid is lessened even further.

Figure 7:
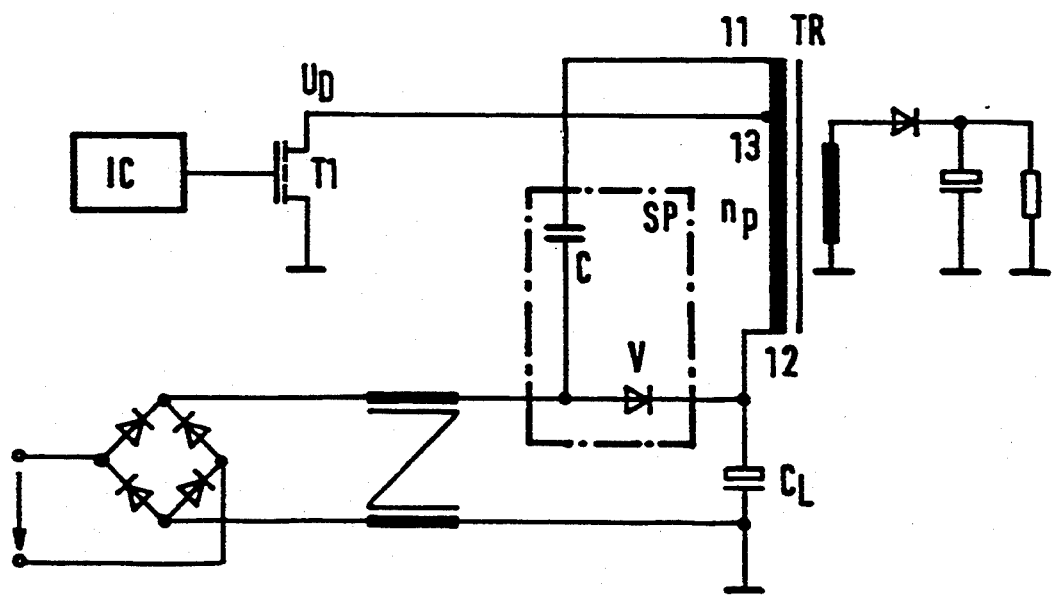
FIG. 7 is a further feature of a blocking-oscillator switched-mode power supply of the second embodiment.
Figure 6A:
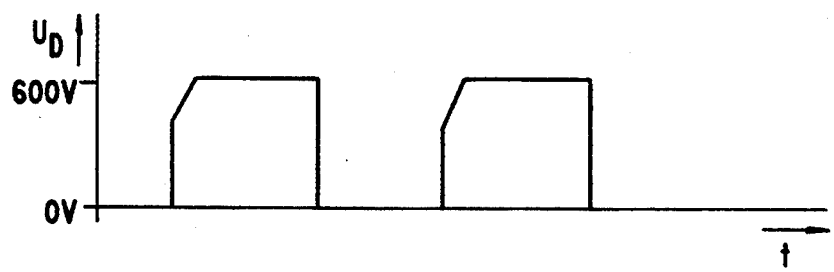
FIG. 6 is a diagram of the courses of current and voltage in the blocking-oscillator switched-mode power supply in FIG. 5.
Figure 6B:
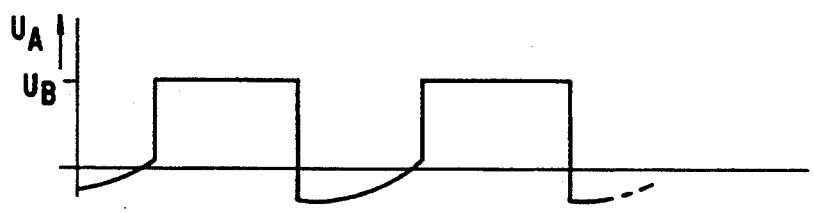
Figure 6C:
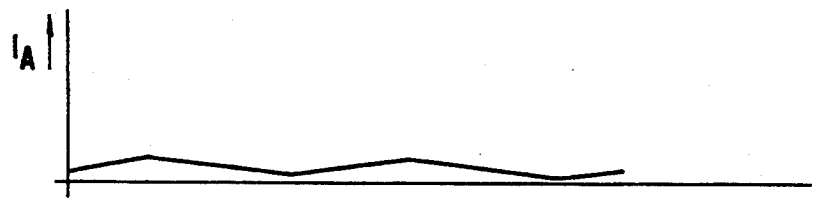
Figure 6D:
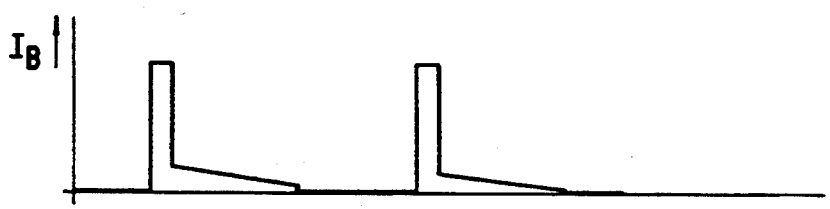
Figure 6E:
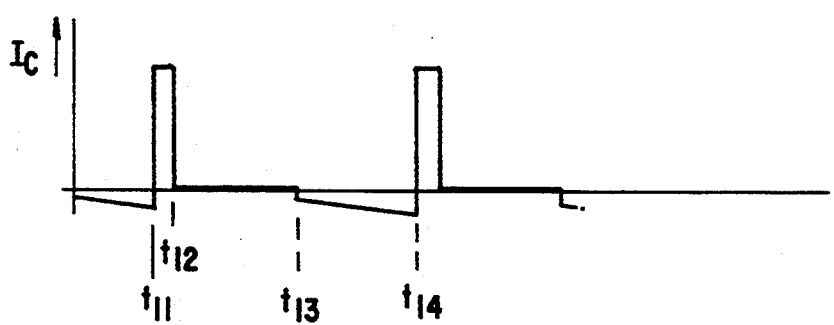

The current consumption is then as sinusoidal as possible precisely whenever the voltage rise of the node 22 is approximately equal to the peak value of the grid voltage. It has been demonstrated that because of the parasitic effect of the components, the voltage rise at the node is slightly less than the peak value of the grid voltage. As is shown in FIG. 7, in order to compensate for this, the capacitor C of the current pump SP is connected to a winding connection 11 of the primary winding $n_P$ that is located outside connections 12, 13 thereof for the smoothing capacitor $C_L$ and the switching transistor $T_1$. As a result, the rise at the node 22 is increased. Through the use of a suitable selection of the tap, the voltage rise can be adjusted on the order of magnitude of the peak value of the grid voltage.

Overshoot pulses of the drain voltage $U_D$ of the switching transistor T1 are effectively cut off at the top immediately after the shutoff of the transistor by means of the capacitor of the current pump SP, in the circuits of FIGS. 5 and 7. Accordingly, no snubber circuit is necessary. Moreover, an otherwise normally used capacitor connected parallel to the drain-to-source path of the switching transistor T1 can be dispensed with. As a result, it is possible to turn the switching transistor T1 on at any time, that is regardless of the value of the secondary voltage.

I claim:

1. A blocking-oscillator switched-mode power supply for sinusoidal current consumption, comprising:
   a transformer having a primary winding with a first and a second terminal;
   a bridge rectifier for rectifying an alternating voltage, said bridge rectifier having an output at which a positive voltage can be picked up and a terminal connected to a reference potential, said output of said bridge rectifier being connected to said first terminal of said primary winding;
   a smoothing capacitor for smoothing the rectified alternating voltage, said smoothing capacitor having a first terminal connected to said first terminal of said primary winding and a second terminal connected to the reference potential;
   a semiconductor switching element having a load path, a first terminal connected to said second terminal of said primary winding, and a second terminal connected to the reference potential, said semiconductor switching element having a turn-on phase and a blocking phase;
   a control device connected to said semiconductor switching element for triggering said semiconductor switching element;
   a current pump comprising a capacitive device and a rectifier configuration;
   said rectifier configuration having a first terminal connected to said output of said bridge rectifier and a second terminal connected to said first terminal of said smoothing capacitor, and said rectifier configuration having a conducting direction being oriented for charging said smoothing capacitor; and
   said capacitive device having a first terminal connected to said output of said bridge rectifier and a second terminal connected to a connection of said transformer at which a voltage can be tapped being in the same direction as and in proportion to a voltage that can be tapped at a load path of said semiconductor switching element.

2. The blocking-oscillator switched-mode power supply according to claim 1, wherein:

said primary winding of said transformer has a first tapping terminal connected to the load path of said semiconductor switching element; a second tapping terminal connected to the one terminal of said smoothing capacitor; and a third tapping terminal between the first and second tapping terminals being the one connection of said transformer connected to the second terminal of said capacitive device.

3. The blocking-oscillator switched-mode power supply according to claim 1, including a choke having one terminal connected to the output of said bridge rectifier and another terminal connected to the first terminal of said rectifier configuration and to the first terminal of said capacitor configuration.

4. The blocking-oscillator switched-mode power supply according to claim 3, wherein:

said primary winding of said transformer has a first tapping terminal being the one connection of said transformer connected to the second terminal of said capacitive device; a second tapping terminal connected to the one terminal of said smoothing capacitor; and a third tapping terminal between the first and second tapping terminals being connected to the load path of said semiconductor switching element.

5. The blocking-oscillator switched-mode power supply according to claim 1, wherein said capacitive device includes a capacitor.

6. The blocking-oscillator switched-mode power supply according to claim 1, wherein said rectifier configuration includes a diode conducting current from said bridge rectifier and said capacitive device to said smoothing capacitor.

7. The blocking-oscillator switched-mode power supply according to claim 1, including an interference suppression network having at least one choke and being connected up-stream of said bridge rectifier.

8. The blocking-oscillator switched-mode power supply according to claim 1, wherein said capacitive device includes a capacitor with a capacitance in the nF range.

9. The blocking-oscillator switched-mode power supply according to claim 1, wherein said current pump has means for damping overshoot pulses when said semiconductor switching element is turned on and off.

* * * * *